Oct. 24, 1944.    A. M. CRAVATH ET AL    2,361,274
RADIOLOGICAL EXPLORATION SYSTEM
Filed Jan. 29, 1940    2 Sheets-Sheet 1
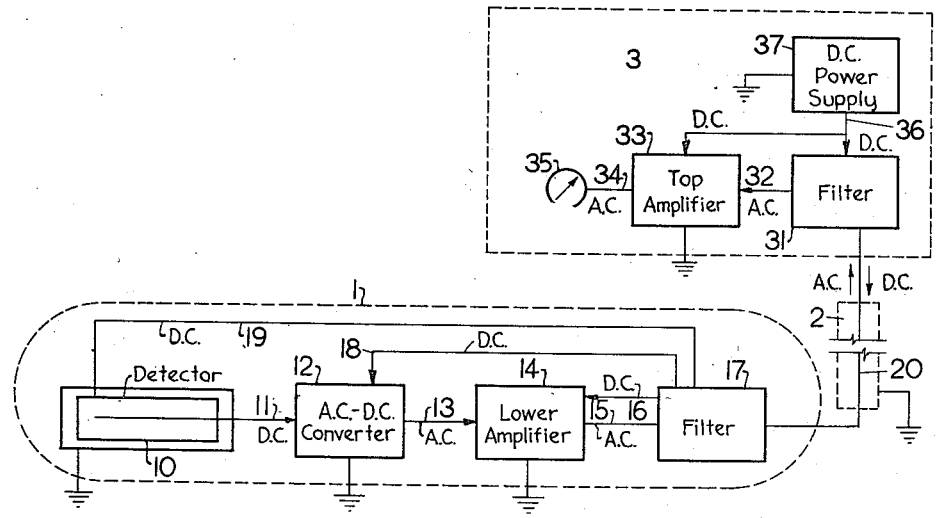
Fig. I
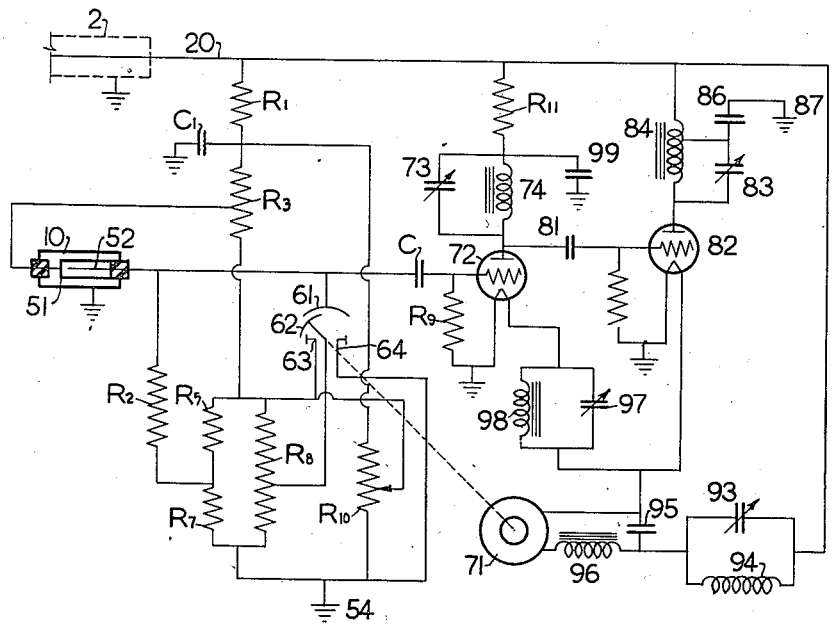
Fig. II
Inventors: Austin M. Cravath
Gerald L. Hassler
By their Attorney:

Oct. 24, 1944.     A. M. CRAVATH ET AL     2,361,274
RADIOLOGICAL EXPLORATION SYSTEM
Filed Jan. 29, 1940     2 Sheets-Sheet 2
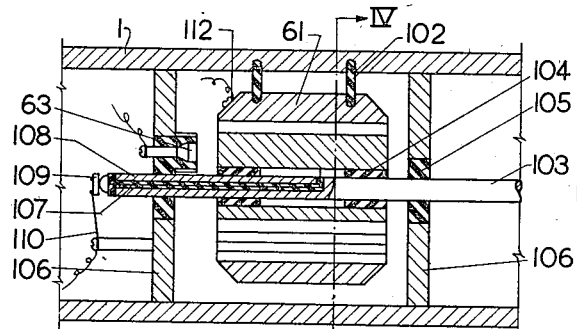
Fig. III
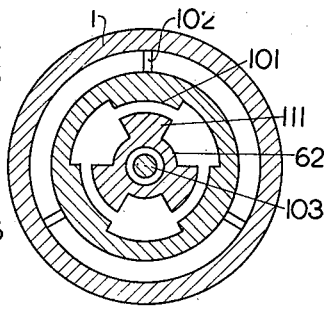
Fig. IV
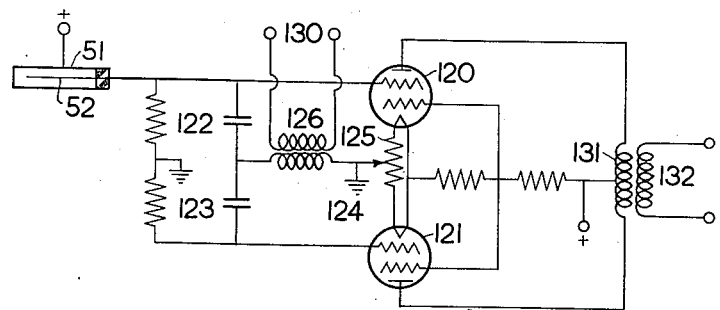
Fig. V
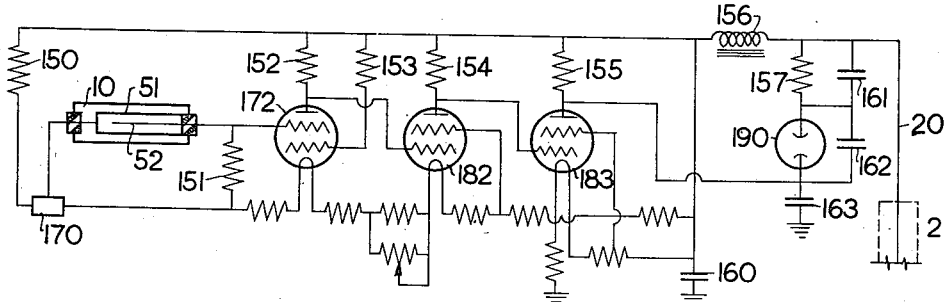
Fig. VI
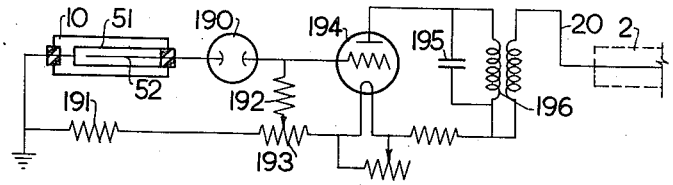
Fig. VII
Inventors: Austin M. Cravath
Gerald L. Hassler
By their Attorney:

Patented Oct. 24, 1944

2,361,274

UNITED STATES PATENT OFFICE 2,361,274

RADIOLOGICAL EXPLORATION SYSTEM

Austin M. Cravath, San Francisco, and Gerald L. Hassler, Berkeley, Calif., assignors to Shell Development Company, San Francisco, Calif., a corporation of Delaware Application January 29, 1940, Serial No. 316,180

4 Claims. (Cl. 250—83.6)

This invention pertains to methods for indicating or measuring extremely small electrical quantities, and relates more particularly to a system whereby extremely weak direct currents are amplified and transmitted to indicators or meters which may be located at considerable distances from said detecting devices.

The present invention finds an especially useful application in the field of radiological exploration of ground strata.

It is known that radio-active elements found in small concentrations in underground formations, such as radium, uranium, thorium, rubidium, and some others, emit radio-active radiations on disintegration.

Since the contents of radio-active elements in various formations differ considerably from each other, and since, furthermore, various substances found in these formations, such as oil, water, etc., have different powers for absorbing and storing radio-active substances or energy, it becomes possible to identify various formations, or at least to differentiate between them, by detecting and measuring the primary or secondary radiations emitted by said formations.

Radiological methods have therefore been lately proposed for mineralogical surveys, geophysical exploration or logging of boreholes. These methods are usually based on the use of a detecting device, such as an ionization chamber or Geiger-Muller counter, combined with suitable amplifying means and a metering device for registering the indications of the detecting device.

Considerable difficulties must, however, be overcome before these radiological methods, and especially the well-logging methods, may be successfully applied in practice to collect accurate and reliable data as to the nature of the formations being surveyed.

Thus, in the first place, the radiation detector, which may be lowered in a suitable housing into the borehole, requires a relatively high and steady D. C. operating voltage, such as about 1000 volts for a Geiger-Muller counter. This voltage must be either transmitted to the detecting device from the surface, or supplied thereto by means of batteries lowered into the well together with the detector. The transmission of this high voltage to considerable depths, such as 5000 or 8000 feet, presents great difficulties, since the fluctuations of the insulation leakage current tend to effectively mask the relatively weak signals of the detector. The use of batteries lowered into the borehole together with the detector is undesirable, as these batteries cannot be relied upon to deliver a steady voltage for a reasonable length of time at the high and changing temperature of the well.

Furthermore, the signals of the detectors, which may be, for example, of the nature of a D. C. ionization current, require high amplification due to their extreme weakness. The disadvantages of sensitive D. C. amplifiers are well known. For example, any drift in the output of one stage, due to varying filament emission or changing plate voltage, is amplified in the succeeding stages and appears in the output, distorting or masking the effect sought. Furthermore, a D. C. amplified signal cannot be passed through condensers or transformers, which restricts in many ways the design of the desired apparatus. Condenser tap-key or clockwork devices sometimes used to amplify direct currents tend, due to unavoidable contact and frictional potentials, to create accidental pulses of a nature similar to that of true signals, which thus lose their distinctive character. Finally, most highly sensitive D. C. amplifiers, such as the usual compensated multi-stage amplifiers, require the use of several independent batteries, whose use in boreholes is objectionable for reasons stated above.

It is, therefore, an object of this invention to provide a system whereby a detector of a type such as an ionization chamber or a Geiger-Muller counter can be most economically and effectively used for the purposes of radiological ground survey.

It is also an object of this invention to provide a system for transferring the indication of ionization currents or other raw effects of radiation to the surface by converting said raw effects into a signal of distinctive character, such as an alternating current suitable for selective amplification.

It is also an object of this invention to provide a system whereby a detector of the above type may be lowered into deep boreholes and operated for well-logging purposes by means of a cable containing a single electrical conductor.

These and further objects and features of the present invention will be understood from the following description taken with reference to the attached drawings, wherein:

Fig. 1 is a diagram schematically showing the general arrangement of apparatus and the flow of electric currents in the system of the present invention.

Fig. 2 is a diagram showing in detail the circuits used according to the present invention for the detection, conversion, amplification and filtering of electric currents.

Fig. 3 is a longitudinal cross-section view of an electrostatic alternator used according to the present invention.

Fig. 4 is a cross-section view taken along line IV—IV of Fig. 3.

Fig. 5 is a diagram of a vacuum tube circuit used according to the present invention to convert direct currents into alternating currents.

Figs. 6 and 7 are diagrams of relaxation oscillator or neon tube circuits used according to the present invention to convert direct currents into alternating currents.

The general arrangement of apparatus used according to the present radiological well-logging system is shown in Fig. 1 wherein 1 diagrammatically indicates a fluid-tight housing adapted to be lowered into a borehole on an insulated and, if desired, sheathed cable 2 comprising preferably a single insulated conductor 20. 3 generally denotes the power supply and indicating devices used at the surface.

The housing 1 contains a detector 10, which, for clearness, will be referred to in the following description as an ionization chamber, although it is understood that other types of detectors, such as Geiger-Muller counters, electroscopes, or other devices whose output may conveniently be caused to generate the desired signal, may be equally well used. The ionization chamber 10 may be of conventional design, and is filled with a suitable gas, such as argon, nitrogen, dichlorodifluoro-methane, etc., at a pressure, varying according to circumstances, from, for example, about 5 to about 100 atmospheres or higher. When a suitable operating D. C. voltage, such as 100 volts or more, is impressed from the surface between the electrodes of the ionization chamber through cable 2, filter 17 and conductor 19, and the chamber is subjected to radio-active radiation, an ionization current flows from one of said electrodes through conductor 11. Since the intensity of said direct ionization current is extremely small, such for example, as $10^{-15}$ amperes, this current is first converted into alternating current by means of a converter 12, to which an operating D. C. voltage may be supplied from the surface through filter 17 and conductor 18, and is then suitably amplified by means of amplifier 14, which may comprise one or more stages of vacuum tube amplification. The amplified signals from the detector 10 are then passed in the form of alternating current through conductor 15 and filter 17, while the operating D. C. voltage is supplied to the amplifier 14 from the surface through cable 2, filter 17 and conductor 16.

The filter 17 and the top filter 31 serve to separate the alternating current signals passing to the surface through the single cable conductor 20 from the operating D. C. current supplied through the same cable to the detector and amplifier within the housing from the surface, and also to eliminate all ripples from the operating voltages supplied to the detector and amplifiers. It is understood that filters 17 and 31 are not necessarily constructed in the form of separate units, as diagrammatically shown in the drawings, but may in practice be associated or combined with other elements of the system.

The apparatus at the surface comprises, besides the top filter 31, a second amplifier 33 and an indicating or metering device 35 for the amplified A. C. signals received from the detector which may, if desired, be of the recording galvanometer or oscillograph type. A D. C. power supply is shown at 37, which may consist of a D. C. generator, battery cells, etc., and provides the necessary direct current for the operation of all the underground and surface apparatus, said power supply apparatus being preferably grounded to permit the use of a single conductor cable. The system is also provided with other necessary ground connections as shown in the drawings.

Fig. 2 shows in greater detail the circuits of the underground portion of the present system.

The conductor 20 within cable 2 is connected to the outer electrode 51 of the ionization chamber 10 through resistances $R_1$ and $R_3$, suitably grounded by means of a condenser $C_1$. The combined value of these resistances being very high, for example, from 500,000 to 1,000,000 ohms and higher, they form, in combination with the condenser $C_1$, a filter whereby any desired potential may be impressed between the electrodes 51 and 52 of the ionization chamber, while rapid changes of potential are not passed thereto, which permits an effective separation of said operating D. C. voltage from the alternating current signals passing to the surface through the cable conductor, as will be described below.

The ionization phenomena occurring within the ionization chamber under the influence of radio-active radiation cause an electric charge to accumulate on the collecting electrode 52 of said chamber, and an ionization current flows therefore from said electrode. Since, for the reasons explained above, it is not desirable to amplify this D. C. ionization current directly, said ionization current is first suitably converted into alternating current. A preferred method of effecting this conversion is as follows: The ionization current is caused to flow to a ground 54 through a high resistance $R_2$, such, for example, as $10^{11}$ ohms. The potential drop created thereby is impressed between the stator 61 and the rotor 62 of an electrostatic alternator, which is essentially a variable condenser driven at a constant speed by a motor 71 so as to vary its capacity at any desired frequency, for example, at 100 cycles per second. The stator 61 of the alternator is connected through a blocking condenser C to the grid of the first amplifying tube 72 provided with a grid leak resistance $R_9$, having a value such as $10^8$ ohms.

The total charge on the system comprising the ionization chamber collecting electrode 52, stator 61, condenser C and the grid of tube 72 remains practically constant during any one cycle of the alternator because of the very high value of the resistances $R_2$ and $R_9$. Hence, the potential of the system comprising said elements varies inversely as its capacity, which is a function of the geometrical displacement of the rotor 62 with regard to the stator 61. It is this variation, or alternation of voltage which is amplified according to the present invention instead of the direct ionization current. The bridge arrangement comprising the resistances $R_5$, $R_7$ and $R_8$, and compensating disks 63 and 64 on the alternator are provided for neutralization purposes, as will be described below.

The purpose of interposing the blocking condenser C between the grid and the electrostatic alternator is to prevent the D. C. grid current of tube 72 from affecting the D. C. potential difference between the stator and rotor. A relatively large grid current becomes, therefore, permissible, making it possible to use ordinary vacuum tubes instead of the expensive so-called "electrometer tubes" having a small grid current. This arrangement also increases the gain of the first amplification stage, as compared to the gain obtainable with an electrometer tube, by a factor from 10 to 100, which increase of signal level greatly reduces the relative effect of all disturbances originating after the first tube, such as the magnetic pickup of stray alternating fields, commutator noise currents from the motor passing through the motor filters to the cable, etc.

The bridge arrangement $R_3$—$R_5$—$R_7$—$R_8$ serves to prevent spurious signal voltages which might otherwise be produced in the circuit by fluctuations in the D. C. supply voltage delivered by the cable 2. Fluctuations in said supply voltage which occur slowly enough will cause fluctuations in the voltage delivered by filter $R_1C_1$, and hence also fluctuations in the potential of ionization chamber electrode 51. Through the capacity between electrodes 51 and 52, these fluctuations of potential are transmitted to the stator 61. However, rotor 62 derives its potential from the same filter $R_1C_1$, and hence is subject to similar potential fluctuations. Proper adjustment of potentiometer resistance $R_3$ makes the fluctuations of potential of the stator substantially equal to those of the rotor, so that the potential difference between stator and rotor is practically free from fluctuations. Hence the A. C. signal, whose strength is determined by said difference of potential, is free from spurious voltage caused by fluctuations of the D. C. supply voltage.

The electrostatic alternator is diagrammatically shown in Figs. 3 and 4. It comprises a stator 61, having any desired number of electrically interconnected poles or condenser plates 101, three such poles being shown in Fig. 4. The stator is held within the housing 1 by means of insulated supports, such, for example, as quartz rod insulators 102. The rotor 62, having a number of electrically interconnected poles or condenser plates 111 equal to that of the stator, is insulated from said shaft by insulator bushings 104. The shaft 103 is supported on bearings 105 between steel plates 106 held within the housing 1 and serving as magnetic shields for the electrostatic alternator.

A conductor 107, led through an insulated hollow portion 108 of the shaft 103, electrically connects the rotor 62 into the desired circuits, as shown in Fig. 2, by means of platinum point contacts 109, held together by means of a spring 110. Suitable circuit connections are likewise provided for the stator 61 as shown at 112.

In general, between two different points on the rotor and stator, there will be a so-called contact difference of potential, amounting to a few tenths of a volt or less, which is caused by differences in surface conditions, such, for example, as degree of oxidation. These contact potentials produce a spurious A. C. signal which must be neutralized. The principal component of said spurious voltage is neutralized, as described above, by applying a D. C. voltage between the rotor and the stator by means of the bridge $R_3$—$R_5$—$R_7$—$R_8$ shown in Fig. 2. There is also a smaller component of the spurious signal, caused by lack of symmetry in the contact potentials of the several poles of the rotor and the stator, which is 90° out of phase with the principal component. Even after special adjustment, polishing and cleaning of the rotor and stator surfaces, for example, with abrasive powder and distilled water, this component remains too large to be ignored. To neutralize this component voltage, two neutralizing disks 63 and 64 (disk 63 being shown in Fig. 3, and both disks 63 and 64 being diagrammatically indicated in Fig. 2) are mounted through insulator bushings in plate 106 in such position that the path of the electric flux from said disks to the stator is alternately masked and opened by the ends of the rotating poles of the rotor. Hence, a D. C. potential applied to one of said disks induces an alternating potential in the stator, the positions of the disks being chosen so that this potential is 90° out of phase with the principal component. In the particular three-pole embodiment of the electrostatic alternator shown in Figs. 3 and 4, there are used two disks which are apart 180° electrically and 60° geometrically, so that a neutralizing effect of either desired polarity may be obtained by applying a positive adjustable voltage from resistance $R_{10}$ to one of said disks, the other disk being grounded as shown in Fig. 2. A suitably grounded brush (not shown in the drawings) in contact with the shaft 103 provides positive grounding for the shaft whose potential might otherwise fluctuate due to small voltages generated by bearing friction and by capacitive coupling to the motor armature.

The shaft 103 supporting the rotor may be driven by any suitable motor, deriving its power from the cable supply current, and preferably maintained at a constant speed by means of a sensitive governor. The construction of the motor and governor being conventional, said motor is only diagrammatically indicated at 71 in Fig. 2, said figure showing also the method of connecting said motor into the circuits within the housing 1. Motor 71 should preferably require only a small current, such as 100–200 milliamperes for its operation.

The electrostatic alternator having been described above only in so far as its use is necessary for the purpose of converting the D. C. signals from the ionization chamber into alternating current, it is understood that other suitable means or systems for effecting such conversion may equally well be used for the purposes of this invention.

One of such system is diagrammatically shown in Fig. 5, and comprises two vacuum tubes 120 and 121, which may be space-charge grid electrometer tubes, having their filaments connected in parallel and their plates connected in "push-pull" arrangement to transformer 131. The collecting electrode 52 of the ionization chamber 10 is connected to the grid of tube 120.

When the output terminals of a vacuum tube oscillator, shown at 130, are connected to the primary winding of transformer 126, and the symmetry of the circuit is properly adjusted by means of the potentiometer 125, equal alternating voltages are applied to the two control grids. If no D. C. potential is applied to said grids, as will be the case when no ionization current flows to the ground from electrode 52 through the resistance $R_2$, the A. C. plate currents of the two tubes will be equal and no voltage will be induced in the primary of transformer 131 whose secondary 132 forms the input to the first amplifier tube (72 in Fig. 2). An ionization current, however, will give a D. C. voltage difference between the control grids of the two tubes 120 and 121, thus producing a difference in the amplification and plate currents of said tubes if the latter are operated on the curved parts of their characteristic grid voltage-plate current curves. This alternating difference in plate currents of tubes 120 and 121 induces an alternating voltage in the primary of transformer 130 which is substantially proportional to the intensity of the ionization current, thus effecting the desired conversion of direct into alternating current.

Another method of converting D. C. signals from the ionization chamber into alternating current is schematically illustrated in Fig. 6.

In this embodiment of the invention, the current collecting on the electrode 52 of the ionization chamber 10 after being suitably amplified through any desired number of amplification stages including, for example, tubes 172, 182 and 183, of which the first should preferably be of the electrometer type, is impressed on a relaxation oscillator such as a neon or glow tube 190, adjusted to a desired value of threshold or flash voltage. When the voltage applied to said tube reaches said value, a current is passed between the electrodes of said tube, and a pulse is sent further to the amplifying and indicating apparatus through the conductor 20 in cable 2, the frequency of said pulses being a function of the intensity of the ionization current supplied to the neon tube. A choke 156 is used to protect the plate voltage of the amplifying tubes from the pulses of the neon tubes. Resistances 150, 151, 152, 153, 154 and 155, condensers 160, 161 and 162 and a voltage regulator 170 (which may also be of the neon tube type) are connected into the circuit for supplying the operating potentials to the ionization chamber and the amplifying stages, and to separate the operating current delivered thereto from the signal pulses being transmitted to the surface, in a manner similar to that shown with regard to Fig. 2.

When using a neon tube of sufficiently constant flash voltage and sufficiently high leak resistance, the amplification stages between the ionization chamber and the neon tube may be dispensed with, as shown in Fig. 7, where the neon tube 190 is connected directly to the ionization chamber. The pulsating output of said tube is amplified by means of tube 194, and is then transmitted to the surface through the cable, an arrangement involving a transformer 196 and condenser 195 being used as before for the separation of the operating and of the signal voltages, while the necessary voltage across the electrodes of the ionization chambers is obtained by passing the operating current through a resistance 191.

Referring again to the diagram of Fig. 2, the A. C. signal output of the electrostatic alternator or of any of the other devices shown in Figs. 5, 6 and 7 to convert D. C. into A. C. is impressed through the condenser C on the grid of the first amplification tube 72. A filter comprising a resistance $R_{11}$ and a condenser 99 is used to prevent feed back through the plate supply. The plate of the first amplifier tube 72 is connected through a condenser 81 to the grid of a second amplifier tube 82. The output of tube 82 is stepped down in voltage and up in current by auto-transformer 84 and is transmitted to the surface through the cable conductor 20. Transformer 84 is tuned to the frequency of the desired signal by condenser 83, thus constituting a filter which substantially eliminates all the undesirable frequencies such as commutator ripple from motor 71, microphonic effects due to vibration, or other magnetic electrical effects, while passing the desired frequency of the A. C. signals and also the D. C. plate current of tube 82. Condenser 86 and ground 87 provide a path for the relatively high current, low voltage A. C. signal current flowing in the cable.

The current for the motor and the tube filaments passes from the cable conductor 20 first through a filter comprising a condenser 93 and an inductance 94, tuned to anti-resonance at signal frequency. The resulting high impedance at signal frequency simultaneously prevents the signal from being shorted to ground by the motor circuit, and also prevents motor noise currents (including armature ripples) of signal frequency from passing to the cable. Motor noise is further suppressed by a filter comprising a choke 96 in series with the motor and a shunt condenser 95, said filter being particularly effective at the higher frequencies.

The motor current is used to feed the filaments of the tubes 72 and 82 in parallel. A filter comprising an inductance 98 and a variable condenser 97, likewise tuned to anti-resonance at signal frequency is further used to protect the especially sensitive circuit of the first amplifier tube.

It is understood that instead of the triode tubes shown for simplicity in the diagram of Fig. 2, pentode or other types of tubes may preferably be used in the described circuits in a manner well understood by those familiar with electrical arts.

The purpose and general method of operation of the signal-indicating, power supply, amplifying and filtering devices used at the surface having been briefly described hereinabove, and the circuits of said amplifying and filtering devices being of types well known in the art, said surface devices will not be further described here.

Although the present system has been described above in its application in combination with the use of ionization chambers for purposes of radiological logging of boreholes, it is understood that the present invention is in no way limited thereto, but may find its application in any other field of electrical engineering wherein the desired object is the conversion, amplification and/or transmission of extremely weak electrical impulses or currents.

We claim as our invention:

1. In an apparatus for the radiological surveying of boreholes, a housing adapted to be lowered into a borehole, said housing comprising an ionization chamber, an electrostatic alternator comprising stator and rotor plates, and an amplifier tube, the grid of said tube forming a system of limited electrostatic capacity with one plate of said alternator and the collecting electrode of said chamber, means for supplying to said chamber and said tube an operating voltage, means for periodically varying the capacity of said system by displacing the plates of said alternator with regard to each other, potentiometer means connected between the other plate of said alternator and the other electrode of the ionization chamber for balancing out the effect of fluctuations of the supply voltage on said alternator by applying a potential proportional to said fluctuations between said alternator plates, and means for indicating the plate current of said amplifier tube.

2. In an apparatus for the radiological surveying of boreholes, a housing adapted to be lowered into a borehole, said housing comprising an ionization chamber, an electrostatic alternator comprising stator and rotor plates, and an amplifier tube, the grid of said tube forming a system of limited electrostatic capacity with one plate of said alternator and the collecting electrode of said chamber, means for supplying to said chamber and said tube an operating voltage, means for periodically varying the capacity of said system by displacing the plates of said alternator with regard to each other, potentiometer means connected between the other plate of said alternator and the other electrode of the ionization chamber for balancing out the effect of fluctuations of the supply voltage on said alternator by applying a potential proportional to said fluctuations between said alternator plates, condenser and grid leak means between said first alternator plate and said amplifier tube grid to eliminate grid current effects on the potential of said first alternator plate, and means for indicating the plate current of said amplifier tube.

3. In an apparatus for the radiological surveying of boreholes, a housing adapted to be lowered into a borehole, said housing comprising an ionization chamber, an electrostatic alternator having stator and rotor plates, and an amplifier tube, the grid of said tube forming a system of limited electrostatic capacity with one plate of said alternator and the collecting electrode of said chamber, means for supplying to said chamber and said tube an operating voltage, potentiometer means connected between the other plate of said alternator and the other electrode of said ionization chamber for balancing out the effect of fluctuations of the supply voltage on said alternator by applying a potential proportional to said fluctuations between said alternator plates, compensating means for neutralizing contact potentials between the alternator plates, said means comprising stationary electrodes adjacent the stator plates, means for establishing an adjustable electrostatic flux between said electrodes and said stator plates by applying a potential therebetween, means for periodically varying the capacity of said system and for interrupting said electrostatic flux by displacing the plates of said alternator with regard to each other, whereby said plate contact potentials are neutralized by potentials induced by the interruptions of said flux, and means for indicating the plate current of said amplifier tube.

4. An apparatus for radiological well logging comprising a housing adapted to be lowered into a borehole, an ionization chamber in said housing comprising an outer electrode and an inner collecting electrode, means for impressing an operating voltage across said electrodes, an amplifier tube having a grid, means comprising a condenser connecting the grid of said tube to said collector electrode, a grid leak resistance to ground connected to a point between said grid and said condenser, an electrostatic alternator comprising stator and rotor plates, one of said plates being connected to a point between said condenser and said collecting electrode, means for periodically varying the capacity of the system comprising said grid and said collecting electrode by displacing the stator and rotor plates with regard to each other, potentiometer means connecting the outer electrode of the ionization chamber with the other plate of the electrostatic alternator, whereby the effect of fluctuations of the operating voltage on the output of the ionization chamber is balanced out by a fraction of said voltage applied between the plates of said electrostatic alternator, and means at the surface for indicating the output current of said amplifier tube.

AUSTIN M. CRAVATH.
GERALD L. HASSLER.